United States Patent

[11] 3,600,702

[72] Inventor  Leonard Charles De Benedictis
              Los Angeles, Calif.
[21] Appl. No. 743,793
[22] Filed     July 10, 1968
[45] Patented  Aug. 17, 1971
[73] Assignee  Union Carbide Corporation

[54] DIFFUSE OPTICAL PUMPING SYSTEM FOR LASERS
     7 Claims, 4 Drawing Figs.

[52] U.S. Cl. .................................................. 331/94.5,
                            350/288, 240/41.35, 240/103
[51] Int. Cl. ................................................... H01s 3/09,
                                         F21v 7/00, G02b 5/08
[50] Field of Search ...................................... 331/94.5;
                                                  240/103, 41.35

[56]                 References Cited
               UNITED STATES PATENTS
3,385,915  5/1968  Hamling ........................ 264/0.5

OTHER REFERENCES

Miles et al., " Optically Efficient Ruby Laser Pump," J. App. Phys. 32 (4), Apr. 1961, pp. 740-1

R.M.B., " Off the Shelf Components for Optical Masers," Electronics, Aug. 4, 1961, pp. 62, 64

*Primary Examiner*—Ronald L. Wibert
*Assistant Examiner*—R. J. Webster
*Attorney*—Pastoriza & Kelly ABSTRACT: A diffuse reflector in the form of a flexible ceramic cloth material is provided in a process for light pumping a laser. The diffuse reflector encloses a laser medium and light source to increase the optical coupling between the light source and medium. The flexible nature of the cloth permits it to snugly engage about the light source and medium and conform to the geometries thereof in such a manner as to define a geometrical enclosure in which the medium constitutes substantially the only light sink for radiation from the light source.

PATENTED AUG 17 1971 3,600,702

INVENTOR:
LEONARD CHARLES DE BENEDICTIS
BY Elliott & Pastoriza
ATTORNEYS.

DIFFUSE OPTICAL PUMPING SYSTEM FOR LASERS

This invention relates generally to laser systems and more particularly, to an improved light pumping process utilizing a diffuse reflecting system for increasing the efficiency of light coupling from a light source to a laser medium.

BACKGROUND OF THE INVENTION

In optical pumping systems for lasers, there is usually provided in addition to a light source for irradiating the laser medium, some type of reflector means to increase the efficiency of coupling of the light into the laser medium. Numerous systems have been developed utilizing suitable specularly reflecting surfaces for focusing the radiation from the light source onto the lasing medium. In the case of very high power lasers, it has been found that diffuse type reflecting surfaces result in a more uniform pumping of the laser medium and in most high powered lasers in use today, such a diffuse type reflecting arrangement is used.

The known types of diffuse surfaces include fired ceramics, powdered oxides of certain metals enclosed in transparent envelopes, metals and films of various materials deposited on reflecting surfaces, and equivalent configurations. In all such instances, however, the geometry of the reflector is dictated by the configuration of the light source and laser medium, Thus a specific type of reflector must be fabricated for each specific type of laser head. Moreover, the reflector itself must be physically spaced so as not to contact the light source such as a flash lamp. This spacing is necessary to avoid shattering of the flash lamp when the laser is fired which could occur from vibration of the lamp under the extreme physical conditions occurring at firing. On the other hand, it is important that the reflecting surface be disposed as closely as possible to the light source ad laser medium to assure optimum coupling of the light energy into the medium.

In addition to the foregoing, any diffuse type reflector must be capable of withstanding the intense flash lamp radiation, alternate exposure to air and colling fluids, and possible corrosive action of compounds created by the radiation from the flash lamp, particularly at high power inputs.

Envelopes of the type containing metal oxides, which are very desirable from the standpoint of providing a diffuse reflectivity in the spectrally useful regions for a given lasing material, are very cumbersome to fabricate and can become easily damaged. Most high purity ceramics are not available except in the simplest of forms.

From the foregoing, it is evident that the provision of a diffuse reflector which is spectrally useful. Capable of withstanding the physical environment of the laser head, and which is properly geometrically adapted; that is, of the desired shape, all results in greatly increased expense and time in fabricating efficient laser system.

BRIEF SUMMARY OF THE PRESENT INVENTION

The foregoing problems encountered with present day diffuse type reflectors for optical pumping systems in lasers are substantially overcome by the present invention.

More particularly, the present invention provides a novel diffuse optical pumping process for lasers in which:

(1) the efficiency is greatly increased over presently known systems by providing a diffuse surface of higher reflectivity in the spectrally useful regions for the lasing medium under consideration;

(2) the diffuse reflector itself is capable of withstanding the total environment of the laser head to the end that there s substantially no risk of shattering of the lamp under intense vibration, or damage to the diffuse reflector itself as a result of alternate exposures to air and coolant or from corrosive action resulting from flash lamp radiation even at extremely high power inputs; and, (3) the physical nature of the diffuse reflector is such that it can readily conform to any desired configuration of light source and laser medium.

The foregoing beneficial results are realized by providing the diffuse reflector in the form of a ceramic cloth of reflective metal oxide which essentially combines the desired spectral reflectivity characteristics of the metal oxide with the inertness of the ceramic material. Because of the cloth configuration, there is provided flexibility so that the cloth material may readily be positioned to surround and conform t the geometries of the laser medium and light source. The result is a geometrical enclosure in which the laser medium itself constitutes substantially the only light sink for radiation from the light source. Further, the flexible nature of the cloth material is such that it may be placed directly in contact with the light source and thus greatly increase the optical coupling efficiency of light energy into the laser. Since there is no rigid material involved, the risk of shattering of the lamp by the reflector is. minimized.

FInally, the porous nature of the cloth material is such that coolant may readily permeate the reflector to provide proper cooling for the tight optical enclosure.

BRIEF DESCRIPTION OF THE DRAWINGS

A better understanding of the invention will be had by now referring to the accompanying drawings, in which.

DETAILED DESCRIPTION OF THE PREFERRED EMBODIMENT

Figure 1:
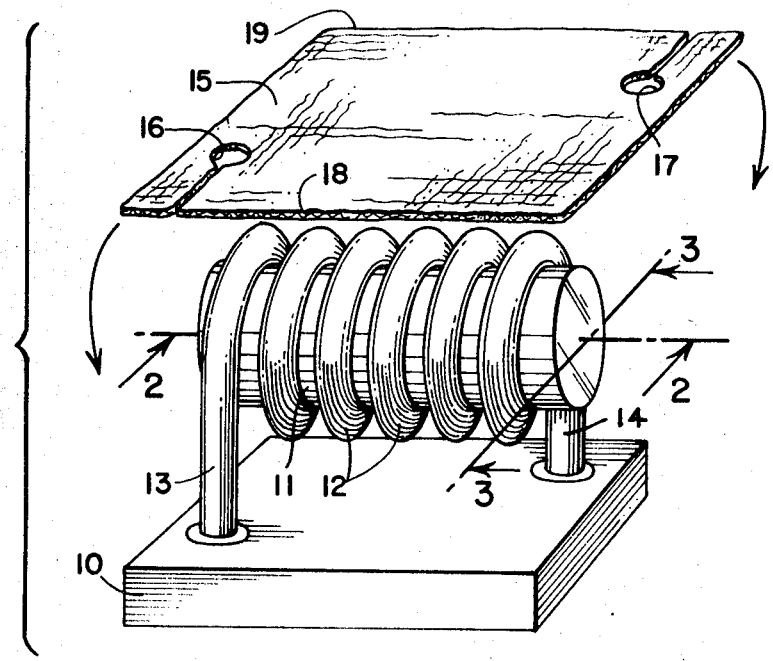
FIG. 1 is a schematic exploded perspective view of a laser head and diffuse reflector preparatory to positioning the reflector about the head.

Referring first to FIG. 1 there is shown, merely by way of example, one type of laser head. This structure includes a base 10 for a laser medium in the form of a solid state host crystal rod 11 surrounded by a helical flash lamp 12 defining a light source. The ends of the spiral flash lamp 12 are indicated at 13 and 14, suitable electrodes (not shown) being received in these end portions for effecting the flash discharge through the helical turns.

It should be understood that the drawing in FIG. 1 is purely schematic and that in an actual embodiment, the helical turns 12 would be quite close to each other so that efficient coupling between the lamp and rod would result. Further, it should be understood that the particular structure illustrated in FIG. 1 shows merely one type of laser system wherein a laser medium of a particular geometry is provided for cooperation with a light source or flash lamp of a geometry suited to the particular medium.

In accord with the present invention, there is provided a diffuse reflector in the form of a ceramic cloth material 15 shown in a generally flat configuration above the laser head in FIG. 1. For the particular geometry disclosed, the cloth 15 is provided with cutouts such as indicated at 16 and 17 so positioned respectively on the front edge 18 and rear edge 19 of the cloth as to accommodate the end portions 13 and 14 of the helical flash lamp 12, when the cloth is positioned about the lamp.

Figure 2:
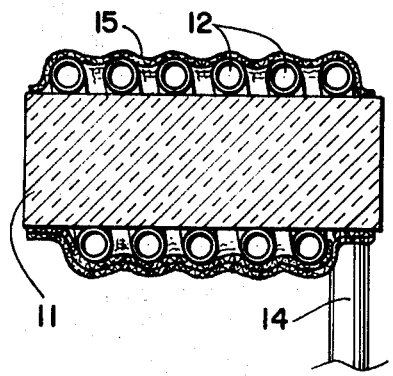
FIG. 2 is a cross section taken in the direction of the arrows 2–2 of FIG. 1 showing the diffuse reflector material in position to define a tight optical enclosure for the laser of FIG. 1.

FIG. 2 illustrates in cross section the resulting configuration when the diffuse reflector cloth 15 has been suitably wrapped about the helical flash lamp and laser medium to define a tight optical enclosure. It will be evident from FIG. 2 that the flexibility of the cloth results in its conforming to the particular geometries of the lamp and rod. In fact, some slight draping between adjacent helical turns of the cloth may occur as shown. Further, it will be evident that the end portions received through the cutout openings described in FIG. 1 are properly accommodated by the cloth so that useful light emitting portions of these ends are substantially enveloped by the cloth.

Figure 3:
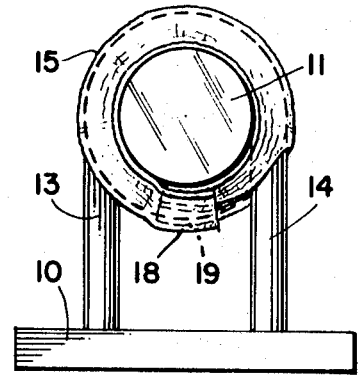
FIG. 3 is an end elevational view taken in the direction of the arrows 3–3 of FIG. 1, again showing the reflecting material in position; and, FIG. 4 is a qualitative plot useful in explaining the improved laser operation resulting from this invention.

In the front view of FIG. 3, it will be noted that the front and rear edge portions of the cloth 18 and 19 have been overlapped at the bottom portion of the laser head. If desired, the cloth material may be provided with a fiberglas lining on its outer surface (not shown).

Figure 4:
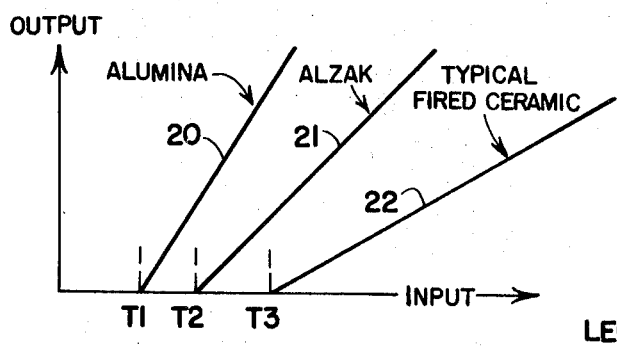

FIG. 4 shows a qualitative plot of characteristics of various types of diffuse reflectors. In this graph, the abscissa represents input light energy passed to the host crystal while the ordinate represents laser output power or energy, Three curves are shown as at 20, 21, 22 having initial points intercepting the abscissa axis at Tl, T2, and T3 respectively. These points on the input axis represent the threshold energies before lasering action commences.

The line 22 is qualitatively representative of known types of ceramic diffuse reflectors wherein physical spacing of the rigid reflector surfaces from the flash lamp itself is necessary. As mentioned heretofore, such separation is required to avoid vibratory movement of the lamp when being fired from causing the lamp to engage the ceramic type of reflector. If the lamp should strike the reflector, it would be shattered. Because of this physical spacing necessary with rigid type diffuse reflectors, the coupling efficiency is relatively poor and thus a high threshold T3 of input energy is necessary before lasering action starts. Further, for a desired output power, a greater input is required as indicated by the slope of line 22.

The line 21 represents a common specular reflector known as Alzak which provides increased efficiency and lower threshold primarily because of its better reflectivity characteristics as compared to the ceramics depicted by the line 22. There is still required however the necessary physical spacing and the difficult fabrication problems to conform the reflector to the geometry of the light source and laser medium.

The last line 20 is qualitatively indicative of the characteristics of the ceramic cloth of the present invention wherein it will be noted that a lower threshold of energy compared to prior art reflectors will initiate lasering action and that greater outputs can be achieved with lesser inputs than characterize the prior art types of reflectors.

The ceramic cloth material 15 is formed of a metal oxide which may be either alumina or zirconia. In actual experiments, it appears that zirconia has somewhat better spectral reflecting properties than alumina but in a particular zirconia sample tested, some degradation of the reflectivity occurred. Therefore the cloth material metal oxide would preferably constitute alumina.

The exact composition of different types of cloth materials that may be incorporated in the invention including the alumina and zirconia materials referred to herein and the preferred process form manufacturing the cloth are set forth in considerable detail in U.S. Pat. No. 3,385,915 issued May 28, 1968. This patent has been assigned to the same assignee as the present invention and its subject matter with respect to details as to the composition and process of forming the cloth is incorporated in here by reference.

OPERATION

In operation, a section of the cloth material 15 is cut in a suitable pattern determined by the geometries of the light source and laser medium. In the specific example illustrated in FIG. 1, the material might be cut in the pattern shown including the cutouts 16 and 17.

Thereafter, the material is simply wrapped about the light source and laser medium in intimate contact therewith to define a tight optical enclosure. The flexibility of the cloth is such that conforming the same to the geometries of the flash lamp and laser medium is simple and may be rapidly carried out. The resulting geometrical enclosure is such that substantially the only light sink for radiation from the light source after the diffuse reflecting cloth is in place constitutes the laser medium itself; in the case of FIG. 1, the crystal rod 11.

Because of the physical porous mature of the cloth itself, it is permeable to cooling fluid and thus will not interfere with proper cooling of the laser head.

Cloth made of a metal oxide having the desired spectral reflectivity characteristics for the particular type of laser under consideration is used in each instance. For a ruby laser, cloth formed of alumina has been found most satisfactory. In this instance, there is exhibited extremely high reflectivity over the spectral band of radiation emitted by the helical flash lamp involved in pumping the ruby.

From all of the foregoing description, it will be evident that the present invention has provided a vastly improved precess for light pumping laser systems wherein the three basic criteria of high efficiency, ability to withstand the environmental conditions and the ease of shaping and conforming the reflector to the particular geometry of the system are fully realized.

While only one specific example of a particular configuration has been set forth in the drawings, the invention is not to be thought of as limited to this specific example.

What I claim is:

1. A process for effecting diffuse optical pumping of a laser medium from a light pump source, comprising the steps of: providing a flexible ceramic cloth material of a reflective metal oxide defining a diffuse reflector; and surrounding the laser medium and light pump source with said cloth material so that said cloth conforms substantially to the geometry of the laser medium and light pump source to provide a diffuse reflecting surface to thereby increase the efficiency of optical coupling in said laser.

2. The process of claim 1, including the step of providing in said cloth material cutout portions to accommodate lead-in portions of said light pump source so that a relatively tight optical enclosure can be defined.

3. A process for effecting diffuse optical pumping in a laser system including a laser medium of a first given geometrical configuration; and a light source of a second given geometrical configuration optically coupled to said laser medium to pump light energy into said medium; said process comprising the steps of: cutting a diffuse reflector in the form of a flexible ceramic cloth material of a reflective metal oxide to provide a desired geometrical pattern; and wrapping said material around said laser medium and light source so that it surrounds and conforms substantially to the geometries of said laser medium and light source to define a geometrical enclosure in which said medium constitutes substantially the only light sink for radiation from said light source.

4. The process of claim 3, in which said cloth material is permeable to cooling fluid so that the resulting tight optical enclosure can be readily cooled.

5. The process of claim 3, in which said metal oxide comprises alumina.

6. The process of claim 3, in which said metal oxide comprises zirconia.

7. The process of claim 3, in which said laser medium comprises a solid host crystal rod and said light source comprises a helical flash lamp passing about said rod, said cloth material being wrapped about said helical flash lamp in physical contact therewith and including the step providing cutout portions to pass the end portions of said flash lamp, said cloth exhibiting slight draping between adjacent turns of the helix to define a substantially tight optical enclosure.